United States Patent
Takatsugi et al.

(10) Patent No.: US 9,656,416 B2
(45) Date of Patent: May 23, 2017

(54) MANUFACTURING METHOD AND INJECTION MOLDING SYSTEM FOR MULTI-COLOR MOLDED ARTICLE

(71) Applicant: FANUC CORPORATION, Minamitsuru-gun, Yamanashi (JP)

(72) Inventors: Satoshi Takatsugi, Yamanashi (JP); Toshio Ishikuro, Yamanashi (JP); Ryousuke Mori, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 121 days.

(21) Appl. No.: 14/030,577

(22) Filed: Sep. 18, 2013

(65) Prior Publication Data

US 2014/0077410 A1 Mar. 20, 2014

(30) Foreign Application Priority Data

Sep. 19, 2012 (JP) .................................. 2012-205882

(51) Int. Cl.
*B29C 45/16* (2006.01)

(52) U.S. Cl.
CPC .... *B29C 45/162* (2013.01); *B29C 2045/1621* (2013.01)

(58) Field of Classification Search
CPC .............. B29C 45/1615; B29C 45/162; B29C 2045/1621; B29C 2045/1623
See application file for complete search history.

(56) References Cited

U.S. PATENT DOCUMENTS

| 3,031,722 | A | * | 5/1962 | Gits ............................... 264/246 |
| 3,466,700 | A | * | 9/1969 | Harrison .................... 425/129.1 |
| 3,475,530 | A | * | 10/1969 | Cooper .......................... 264/246 |
| 4,165,959 | A | * | 8/1979 | Dechavanne ................. 425/130 |
| 4,389,358 | A | * | 6/1983 | Hendry ........................ 264/45.1 |
| 4,792,322 | A | | 12/1988 | Goppelt et al. |
| 5,020,215 | A | * | 6/1991 | Tsai ...................... B29C 45/162 |
|  |  |  |  | 264/297.2 |

(Continued)

FOREIGN PATENT DOCUMENTS

| CN | 101491932 A | | 7/2009 |
| DE | 102005003074 | * | 7/2006 |

(Continued)

OTHER PUBLICATIONS

Electronic translation of DE 102007000994.*

(Continued)

*Primary Examiner* — Jill Heitbrink
(74) *Attorney, Agent, or Firm* — Hauptman Ham, LLP (57) ABSTRACT

An injection molding system is configured to produce a multi-color molded article by simultaneously or sequentially injection-molding resins of a plurality of types by means of a plurality of injection molding machines. An insert mold is mounted in a mold of a first injection molding machine and a primary molded article is molded by this injection molding machine. Thereafter, a robot arm takes out the insert mold, along with the primary molded article, from the mold of the injection molding machine and attaches it to a mold of a second injection molding machine. A two-color molded article is injection-molded by the second injection molding machine and removed as a product.

8 Claims, 6 Drawing Sheets

(56) References Cited

U.S. PATENT DOCUMENTS

| | | | |
|---|---|---|---|
| 5,320,511 A * | 6/1994 | Woerner | B29C 45/0416 264/294 |
| 5,830,390 A * | 11/1998 | Brown et al. | 264/39 |
| 2003/0070784 A1 | 4/2003 | Ikeda et al. | |
| 2004/0212126 A1 | 10/2004 | Tustin et al. | |
| 2009/0243148 A1* | 10/2009 | Gruber | 264/255 |
| 2011/0293775 A1 | 12/2011 | Pfeifer et al. | |
| 2013/0200547 A1* | 8/2013 | Geibel, Jr. | 264/250 |

FOREIGN PATENT DOCUMENTS

| | | |
|---|---|---|
| DE | 102007000994 A1 | 5/2009 |
| EP | 2191951 A1 | 6/2010 |
| JP | 63-115958 A | 5/1988 |
| JP | 310819 A | 1/1991 |
| JP | 04265719 A | 9/1992 |
| JP | 2003117646 A | 4/2003 |
| JP | 4104021 B1 | 6/2008 |
| JP | 2011-173243 A | 9/2011 |
| JP | 2012192550 A | 10/2012 |

OTHER PUBLICATIONS

Electronic translation of DE 102005003074.*
Decision to Grant a Patent mailed May 13, 2014, corresponds to Japanese patent application No. 2012-205882.
Office Action dated Oct. 12, 2015, corresponding to German Patent Application No. 102013016535.0.
Office Action dated May 11, 2015, corresponding to German patent application No. 102013016535.0.
Office Action issued Apr. 28, 2015, corresponding to Chinese patent application No. 201310428784.3.

* cited by examiner

MANUFACTURING METHOD AND INJECTION MOLDING SYSTEM FOR MULTI-COLOR MOLDED ARTICLE

RELATED APPLICATIONS

The present application is based on, and claims priority from, Japanese Application Number 2012-205882, filed, the disclosure of which is hereby incorporated by reference herein in its entirety.

BACKGROUND OF THE INVENTION

Field of the Invention

The present invention relates to a manufacturing method and an injection molding system for a multi-color molded article.

Description of the Related Art

In general, multi-color molded articles are assumed to be products that are obtained by simultaneously or sequentially injection-molding resins of a plurality of types or colors. In this specification, however, all those molded articles which are obtained by simultaneously or sequentially injection-molding even resins of the same type or color by means of a plurality of injection units are referred to as multi-color molded articles. Further, the multi-color molding described herein is a method of simultaneously or sequentially injection-molding resins by means of a plurality of injection units.

There are two known methods of manufacturing multi-color molded articles as follows:

(1) a method using a multi-color molding machine; and
(2) a method based on molded article transfer between a plurality of injection molding machines.

Further, the method (1) includes:

(1A) a submethod in which resins of a plurality of types are simultaneously injected into one mold using a single injection molding machine comprising a plurality of injection units; and (2A) a submethod in which resins of a plurality of types are sequentially injection-molded with molds alternately exchanged by means of a single injection molding machine comprising a plurality of injection units and a mechanism for rotating the molds.

In the method (2), on the other hand, processes are repeated such that a primary molded article injection-molded by a first injection molding machine is set in a predetermined position of a mold of a subsequent or second injection molding machine and injection-molded by the second injection molding machine, and that the resulting molded article is further set in a mold of another subsequent or third injection molding machine and injection-molded.

Japanese Patent Application Laid-Open No. 2009-73151 discloses a manufacturing method for a two-color molded article in which a primary molded article is set in a second injection molding machine by an industrial robot.

Further, Japanese Patent Application Laid-Open No. 4-265719 discloses an insert injection molding method using a single injection molding machine. According to this method, injection molding is performed in such a manner that an insert-molded article is taken out along with an insert mold from a mold and recovered, a new insert is attached to an insert mold, and the insert mold fitted with the new insert is mounted in a mold of an injection molding machine. This conventional method for insert injection molding using the single injection molding machine is different from a manufacturing method for a multi-color molded article according to the present invention in which a plurality of injection molding machines are used for multi-color molding.

The method (1) has a problem that the injection molding machine and mold are usually custom-made, so that they are costly and not versatile. According to the method (2), in contrast, the problem of high cost and lack of versatility of the injection molding machine and mold can be solved. Since the transferred molded article is not in close contact with the destination mold surface, however, resins of second and subsequent colors may penetrate between the molded article and the mold surface, possibly resulting in an undesired product. This problem is particularly acute for optical elements, exterior parts, and other products whose surface shapes are critical.

SUMMARY OF THE INVENTION

Accordingly, the object of the present invention is to provide a manufacturing method for a multi-color molded article and an injection molding system, capable of avoiding the problem of high cost and lack of versatility due to the use of custom-made injection molding machines and molds and of preventing production of undesired molded articles due to penetration of resins of second and subsequent colors between molded articles and insert molds, which may be caused unless the molded articles and insert molds are in close contact with one another.

A manufacturing method for a multi-color molded article according to the present invention is a method in which multi-color molding is performed by means of a plurality of injection molding machines configured to perform injection molding in a predetermined order and insert molds removably mounted in molds incorporated in the injection molding machines, individually. This method comprises a first step of injection-molding the molded article by a first one of the injection molding machines, a second step of taking out the molded article molded in the first step, along with the insert mold fitted with the molded article, from the mold of the first injection molding machine, a third step of transporting the insert mold removed in the second step to a second injection molding machine configured to perform injection molding next to the first injection molding machine, a fourth step of attaching the insert mold transported in the third step to the mold of the second injection molding machine, and a fifth step of performing injection molding by the second injection molding machine. The second to fifth steps are repeated in the predetermined order for each of the injection molding machines.

The insert mold from which the molded article is removed after injection molding by the last one of the injection molding machines may be disengaged from the mold of the last injection molding machine and incorporated again into the mold of the first injection molding machine.

Injection molding may be performed by simultaneously using a plurality of insert molds with different cavity shapes in molding conditions varied for each of the different cavity shapes.

Gate cutting for the molded article may be performed as the insert mold is disengaged from the mold of the injection molding machine or during transportation of the disengaged insert mold.

Further, an injection molding system for multi-color molding according to the present invention comprises a plurality of injection molding machines configured to perform injection molding in a predetermined order for multi-color molding, insert molds removably mounted in molds incorporated in the injection molding machines, individually, an insert mold attaching/detaching mechanism configured to attach and detach the insert molds to and from the molds of the injection molding machines, and an insert mold conveying mechanism configured to transport the insert molds detached from the molds of the injection molding machines from one injection molding machine to another. This system for multi-color molding is configured so that a first one of the injection molding machines injection-molds a molded article and the insert mold attaching/detaching mechanism disengages the insert mold fitted with the molded article from the mold, the insert mold conveying mechanism transports the insert mold to a subsequent or second injection molding machine, the insert mold attaching/detaching mechanism incorporates the insert mold into the second injection molding machine, a molding material different from that for the first injection molding machine is injection-molded by the second injection molding machine, and operations for disengaging the insert mold from the mold of the injection molding machine, transporting the disengaged insert mold, attaching the insert mold to the mold of the injection molding machine, and injection molding are repeated in the predetermined order.

The insert mold attaching/detaching mechanism may comprise an insert mold attaching/detaching robot, an insert mold ejector mechanism incorporated in the mold, and/or an insert mold fixing mechanism incorporated in the mold.

The insert mold conveying mechanism may comprise an insert mold conveying robot and/or a conveyor.

The insert mold being transported may be released from hold or attraction at an intermediate station on which the insert mold is placed and held or attracted again.

The insert mold from which the molded article is removed after injection molding by the last one of the injection molding machines may be disengaged from the mold of the last injection molding machine by the insert mold attaching/detaching mechanism and the insert mold conveying mechanism and incorporated again into the mold of the first injection molding machine.

Injection molding may be performed by simultaneously using a plurality of insert molds with different cavity shapes in molding conditions automatically varied for each of the different cavity shapes.

Gate cutting for the molded article may be automatically performed as the insert mold is disengaged from the mold of the injection molding machine or during transportation of the disengaged insert mold.

According to the present invention, there may be provided a manufacturing method for a multi-color molded article and an injection molding system, capable of avoiding the problem of high cost and lack of versatility due to the use of custom-made injection molding machines and molds and of preventing production of undesired molded articles due to penetration of resins of second and subsequent colors between molded articles and insert molds, which may be caused unless the molded articles and insert molds are in close contact with one another.

BRIEF DESCRIPTION OF THE DRAWINGS

The above and other objects and features of the present invention will be obvious from the ensuing description of embodiments with reference to the accompanying drawings, in which.

DETAILED DESCRIPTION OF THE PREFERRED EMBODIMENTS

Embodiment 1

An example of an injection molding system configured to perform two-color molding with a single insert mold D alternately exchanged between two injection molding machines M1 and M2 will be described with reference to FIG. 1.

This injection molding system comprises the first and second injection molding machines M1 and M2, a robot, and a controller (not shown). The robot serves to attach and detach an insert mold D to and from molds L1 and L2 of the injection molding machines M1 and M2. The controller controls the first and second injection molding machines M1 and M2 and the robot. The controller controls an insert mold attaching/detaching mechanism and an insert mold conveying mechanism, as well as the injection molding machines M1 and M2 and the robot.

The insert mold attaching/detaching mechanism comprises, for example, guide pins, ball screws, etc., attached to the molds L1 and L2. The insert mold D can be attached to, or detached from, the molds L1 and L2 by driving the ball screws under the control of the controller.

The insert mold D is first mounted in the mold L1 of the first injection molding machine M1, and a primary molded article is injection-molded by the first injection molding machine M1. Thereafter, an arm RA of the robot takes out the insert mold D from the mold L1 of the first injection molding machine M1 for each primary molded article, transports the insert mold D fitted with the primary molded article to the second injection molding machine M2, and attaches the insert mold D to the mold L2 of the second injection molding machine M2. If necessary, gate cutting may be performed in the process of take-out or transportation of the insert mold D.

Thereupon, a two-color molded article is injection-molded by the second injection molding machine M2 and removed as a product. Finally, the arm RA of the robot takes out the remaining insert mold D, and the removed insert mold D is attached again to the mold L1 of the first injection molding machine M1, whereupon a new molding cycle is started.

In the example described above, the arm RA for insert mold attachment and detachment and the arm RA for insert mold transportation are each regarded as an arm of the same robot. Alternatively, however, a human, not a robot, may perform the processes of insert mold attachment and detachment and insert mold transportation by the robot arm RA.

Embodiment 2

An example of an injection molding system configured to perform two-color molding with two insert molds D1 and D2 alternately exchanged between two injection molding machines M1 and M2 will be described with reference to FIG. 2.

Figure 1:
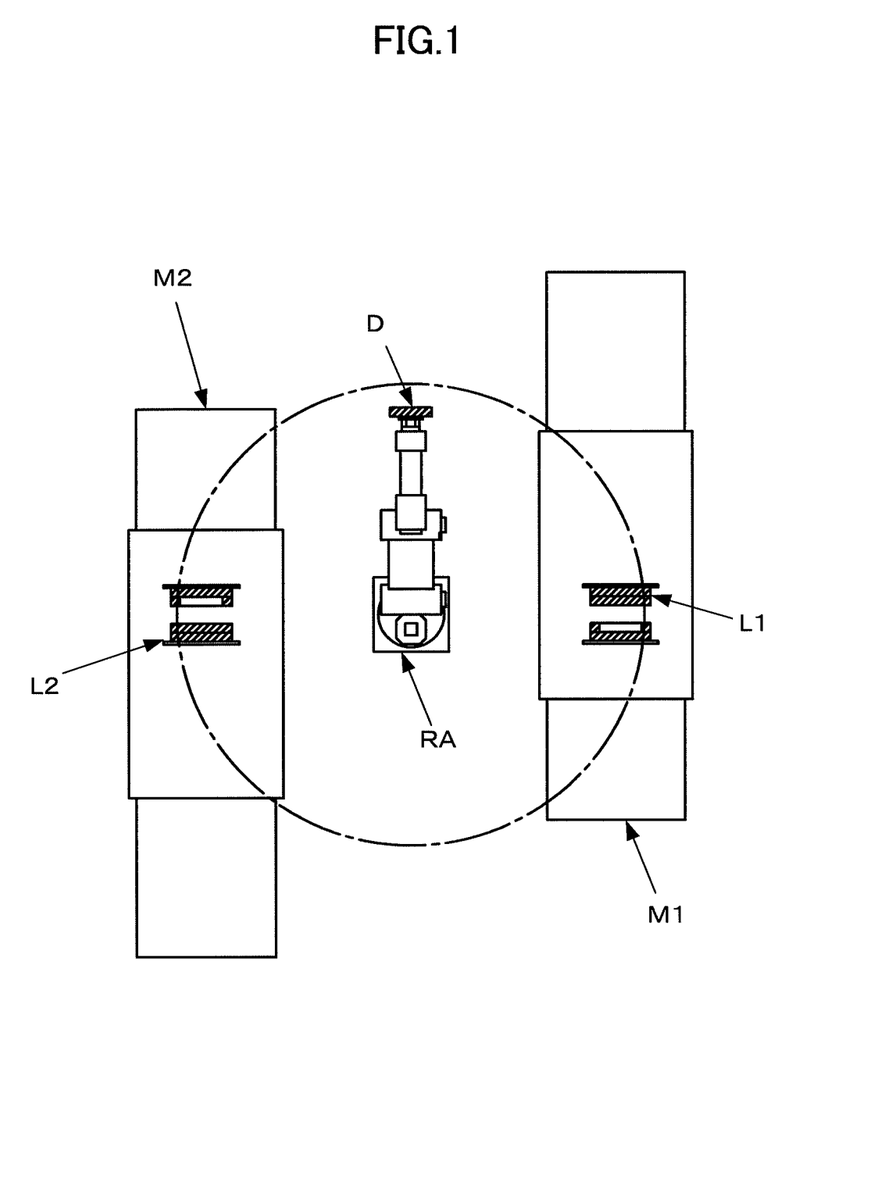
FIG. 1 is a top view showing an example of an injection molding system configured to perform two-color molding with a single insert mold alternately exchanged between two injection molding machines.
Figure 2:
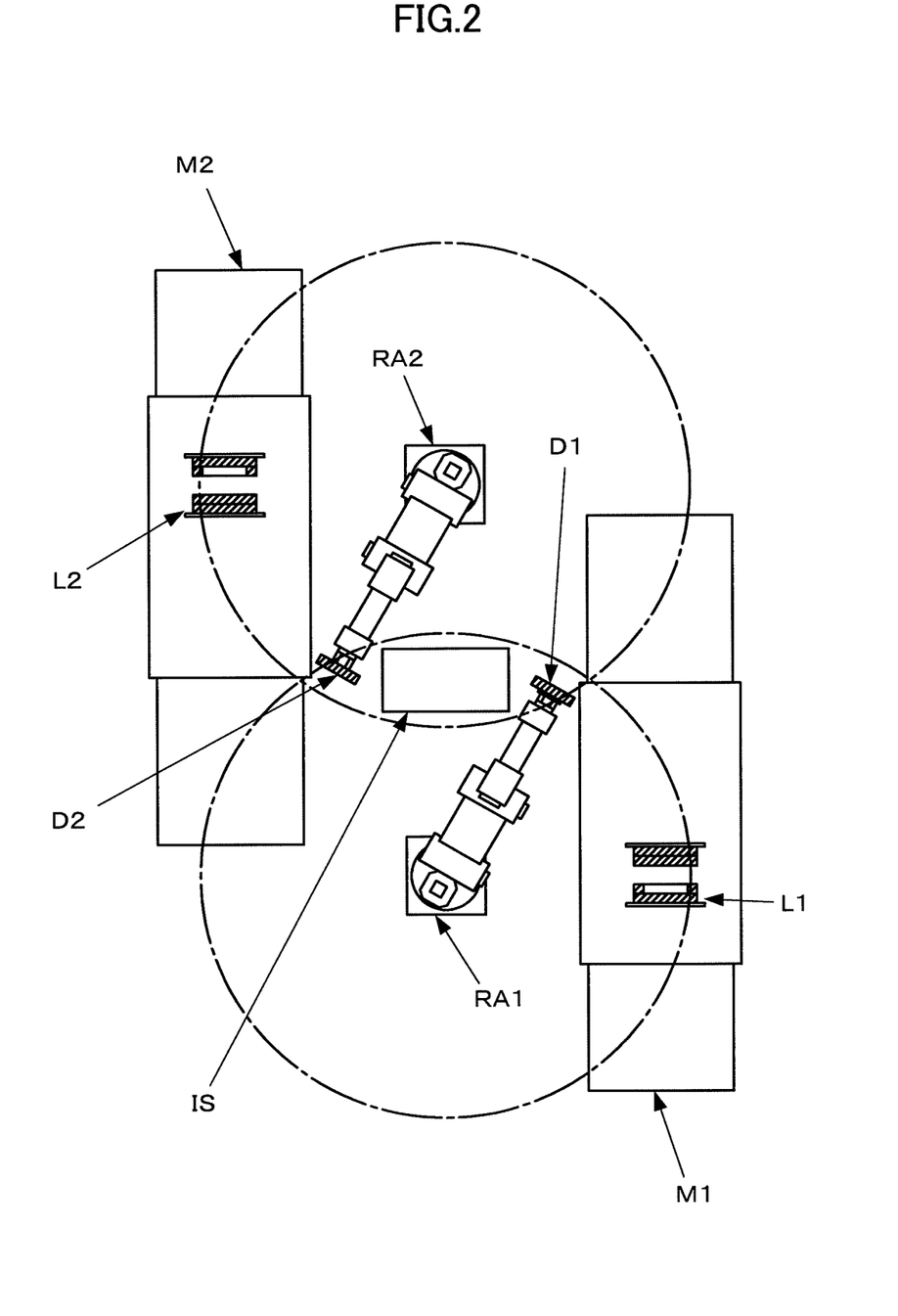
FIG. 2 is a top view showing an example of an injection molding system configured to perform two-color molding with two insert molds alternately exchanged between two injection molding machines.

While the single robot (robot arm) is used in the example shown in FIG. 1, two robots are used in the example shown in FIG. 2.

First, a first insert mold D1 is mounted in a mold L1 of the first injection molding machine M1, and a second insert mold D2 with a primary molded article is mounted in a mold L2 of the second injection molding machine M2. The first and second injection molding machines M1 and M2 individually perform injection molding. Thereafter, an arm RA1 of a first robot takes out the first insert mold D1 with the primary molded article from the mold L1 of the first injection molding machine M1 and transports it to an intermediate station IS. At the same time, an arm RA2 of a second robot disengages the second insert mold D2, from which the completed two-color molded article is removed, from the mold L2 of the second injection molding machine M2 and transports it to the intermediate station IS. FIG. 2 shows how the disengaged insert molds D1 and D2 are being transported to the intermediate station IS.

The arm RA1 of the first robot receives the second insert mold D2 transported by the arm RA2 of the second robot and attaches it to the mold L1 of the first injection molding machine M1. At the same time, the arm RA2 of the second robot receives the first insert mold D1 transported by the arm RA1 of the first robot and attaches it to the mold L2 of the second injection molding machine M2. Thereupon, a new molding cycle is started.

In Embodiment 1 (FIG. 1) described above, one injection molding machine does not perform molding while the other injection molding machine is performing molding, so that availability is low. In Embodiment 2 (FIG. 2), in contrast, the availabilities of the injection molding machines M1 and M2 can be enhanced due to the use of the plurality of robots and insert molds D1 and D2.

The cavity shape of the first insert mold D1 used may be different from that of the second insert mold D2. In this case, molding condition files in which optimum injection rates, injection pressures, injection volumes, etc., for the respective cavity shapes are set are selected manually or automatically in each injection molding cycle.

Embodiment 3

An example of an injection molding system configured to perform three-color molding with two insert molds D1 and D2 alternately exchanged between three injection molding machines M1, M2 and M3 will be described with reference to FIG. 3.

As in Embodiment 1 (FIG. 1), a single robot (robot arm) is used in this injection molding system. FIG. 3 shows how an arm RA of the robot is transporting a second insert mold D2, from which a molded article is removed after molding by the third injection molding machine M3, to a mold L1 of the first injection molding machine M1 while the second injection molding machine M2 is performing molding for a second color by means of the first insert mold D1 mounted therein. Thus, the availability of the arm RA of the robot can be enhanced by removing the other insert mold (second insert mold D2 in the state of FIG. 3) from molds L1, L2 and L3 of the injection molding machines, transporting it, and attaching it to the molds L1, L2 and L3 by means of the arm RA during injection molding using one insert mold (first insert mold D1 in the state of FIG. 3).

An example of an injection molding system configured to perform three-color molding with four insert molds D1, D2, D3 and D4 alternately exchanged between three injection molding machines M1, M2 and M3 will be described with reference to FIG. 4.

Four robots (robot arms) are used in this example of Embodiment 3. As shown in FIG. 4, arms RA2, RA3 and RA4 of second, third, and fourth robots take out the second, third, and fourth insert molds D2, D3 and D4 from molds L2, L3 and L4, respectively, after injection molding by the first to third injection molding machines M1, M2 and M3 is finished. Then, the arms RA2 and RA3 of the second and third robots attach the second and third insert molds D2 and D3 (each fitted with a molded article) to the molds L2 and L3 of the injection molding machines M2 and M3, respectively. As this is done, the arm RA4 of the fourth robot places the fourth insert mold D4 (cleared of a molded article) on a conveyor C. At the same time, the arm RA1 of the first robot attaches the insert mold D1 (without a molded article thereon) transported by the conveyor C to the mold L1 of the first injection molding machine M1. Thereupon, the first to third injection molding machines M1, M2 and M3 newly start molding. Depending on the length and speed of the conveyor C and the molding cycle time, more insert molds may be simultaneously used so that a plurality of insert molds are transported by the conveyor C.

Figure 3:
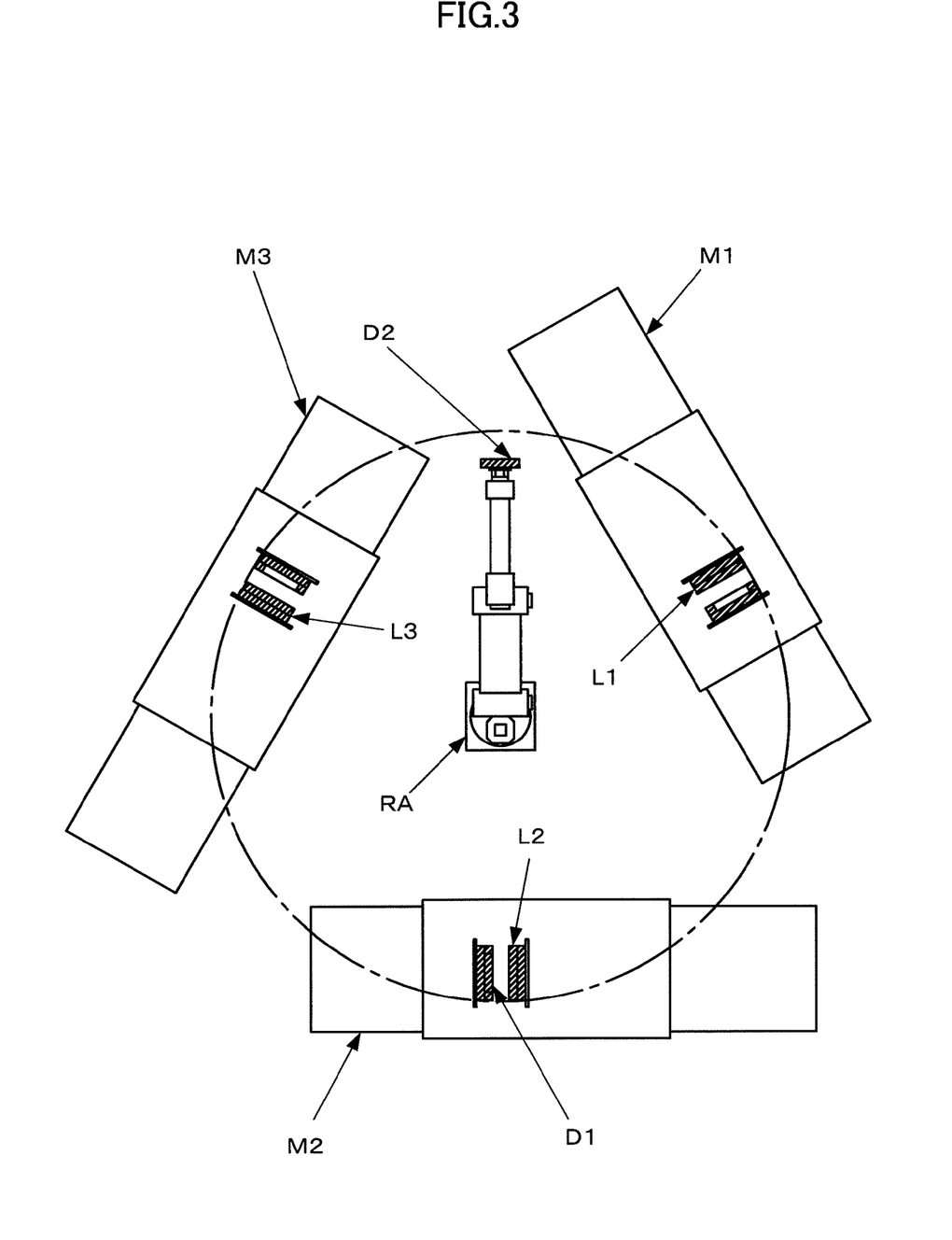
FIG. 3 is a top view showing an example of an injection molding system configured to perform three-color molding with two insert molds alternately exchanged between three injection molding machines.
Figure 4:
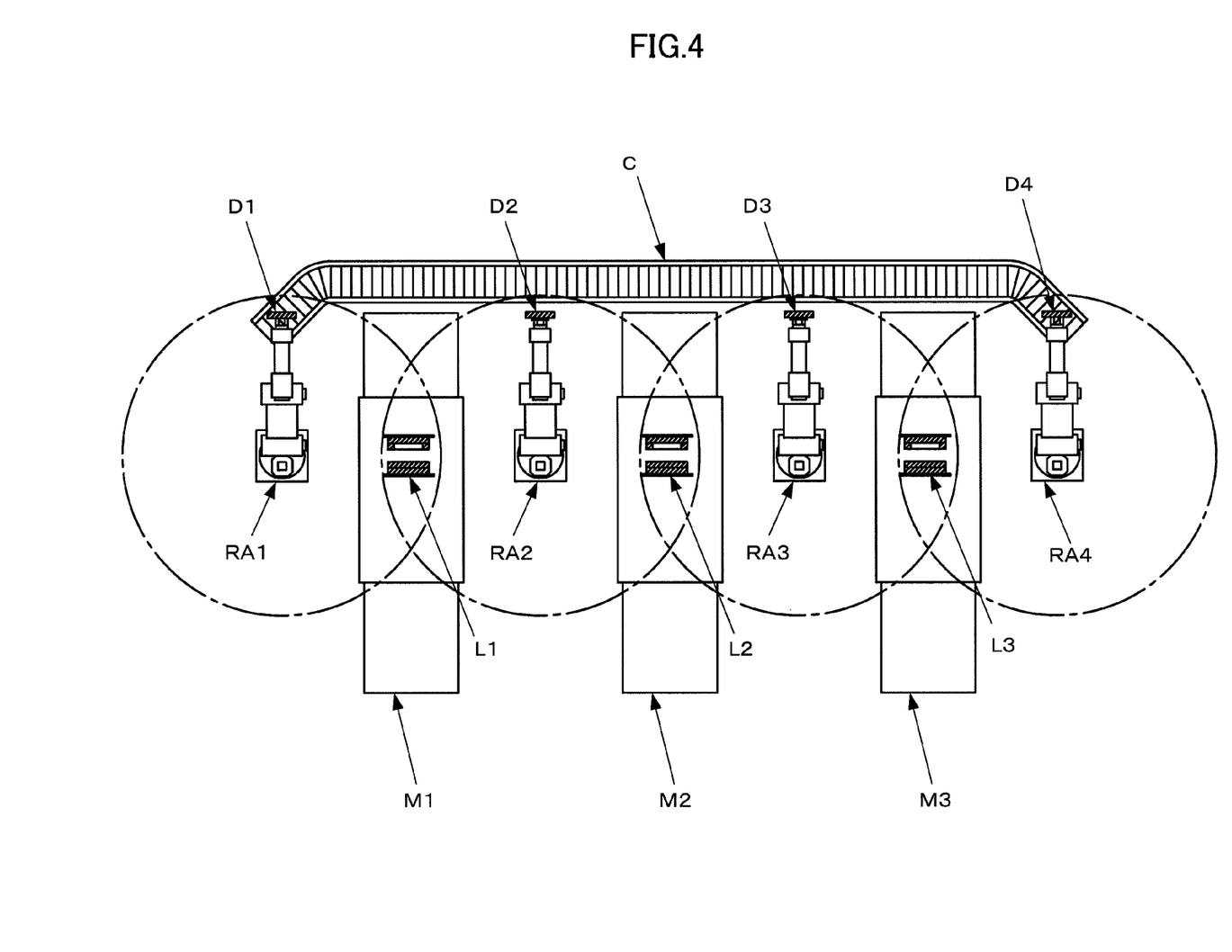
FIG. 4 is a top view showing an example of an injection molding system configured to perform three-color molding with four insert molds alternately exchanged between three injection molding machines.

Thus, as shown in FIGS. 3 and 4, an appropriate number of insert molds to be used may be selected according to the system configuration, molding cycle time, and other conditions.

Embodiment 4

An example of an injection molding system configured to perform four-color molding with four insert molds D1, D2, D3 and D4 alternately exchanged between four injection molding machines M1, M2, M3 and M4 will be described with reference to FIG. 5.

Figure 5:
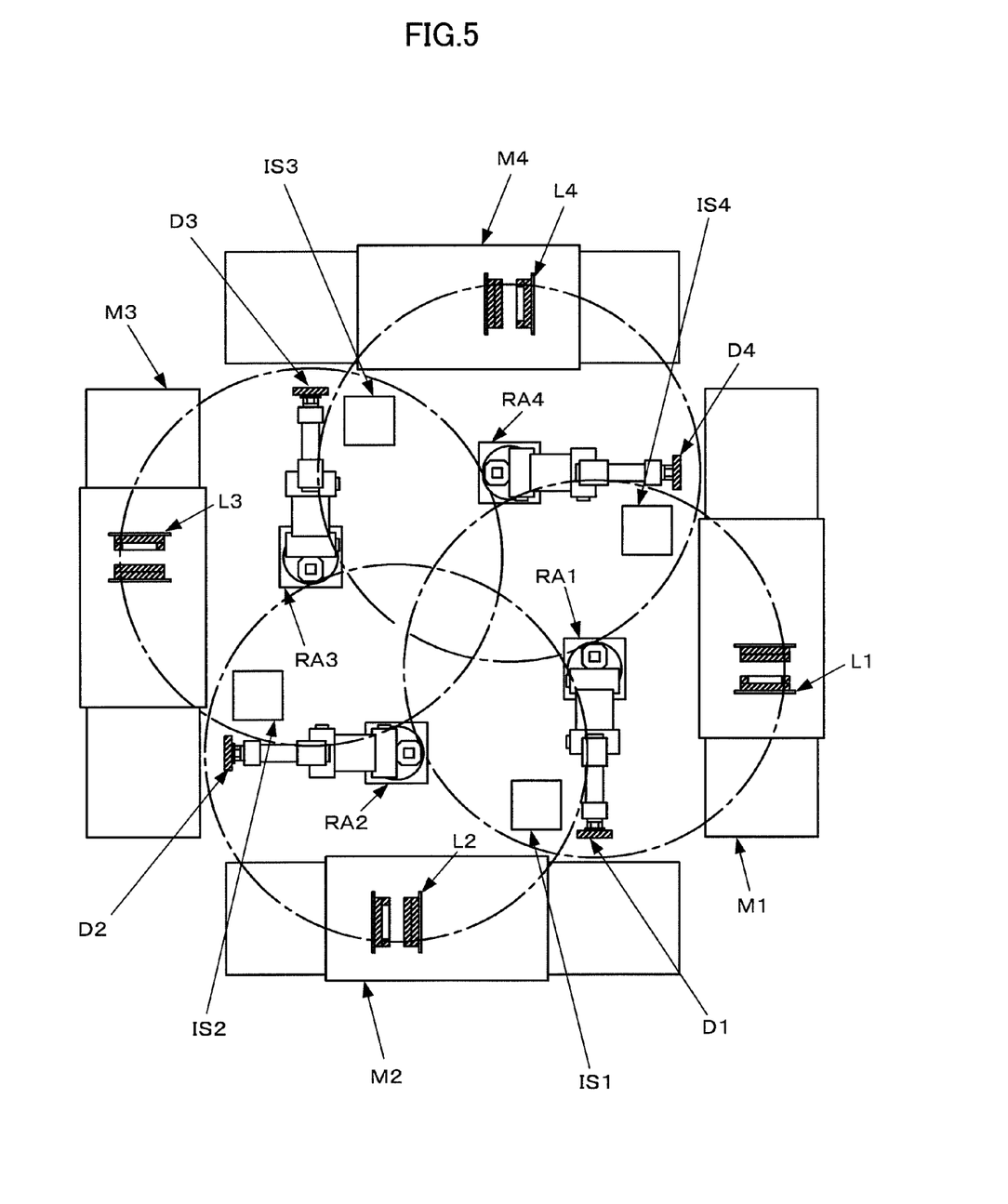
FIG. 5 is a top view showing an example of an injection molding system configured to perform four-color molding with four insert molds alternately exchanged between four injection molding machines.

In the injection molding system shown in FIG. 5, basically as in the injection molding system shown in FIG. 2, the four insert molds D1, D2, D3 and D4 are sequentially attached to molds L1, L2, L3 and L4 of four injection molding machines M1, M2, M3 and M4 through four intermediate stations IS1, IS2, IS3 and IS4 by arms RA1, RA2, RA3 and RA4 of first, second, third, and fourth robots, respectively, and injection molding is performed by the injection molding machines M1 to M4, whereupon a molded article is manufactured.

Further, the injection molding system of FIG. 5 may be replaced with a combination of two injection molding systems each configured to perform two-color molding.

In this injection molding system, the first and second injection molding machines M1 and M2 manufacture a two-color molded article in a pair (first group), while the third and fourth injection molding machines M3 and M4 manufacture a two-color molded article in a pair (second group). Further, the molds to be fitted with the insert molds may be different ones that vary for each group of two-color molding systems.

As in the example shown in FIG. 2, moreover, the respective cavity shapes of the four insert molds D1, D2, D3 and D4 used need not be identical. Thus, eight types of two-color molded articles, at the maximum, can be manufactured if the injection molding system of FIG. 5 is used as a system for performing two-group two-color molding and insert molds of different cavity shapes are used.

Figure 6:
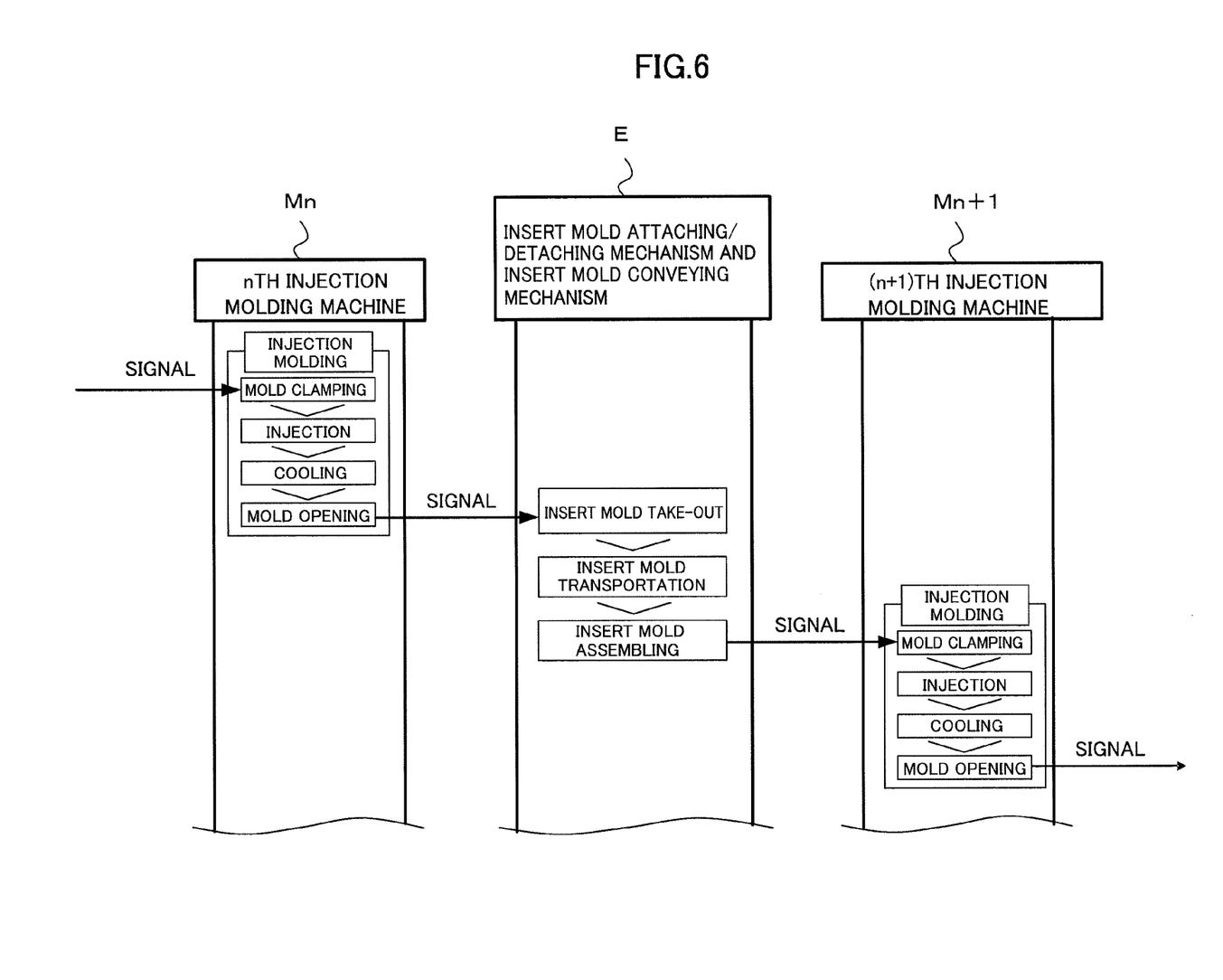
FIG. 6 is a diagram illustrating how molding is performed by repeating processes such that when injection molding by an n-th injection molding machine is completed, an insert mold attaching/detaching mechanism and insert mold conveying mechanism receive a signal indicative of the completion and start operation, and that when insert mold attachment is completed, an (n+1)th injection molding machine starts injection molding.

In the injection molding systems shown in FIGS. 1 to 5, as described above, each injection molding machine, insert mold attaching/detaching mechanism, and insert mold conveying mechanism have the function of exchanging a signal with one another. When injection molding (including mold clamping, injection, cooling, and mold opening) by an n-th injection molding machine Mn is completed, the insert mold attaching/detaching mechanism and insert mold conveying mechanism E receive the signal and start operation, as shown in FIG. 6. When insert mold attachment is completed, an (n+1)th injection molding machine Mn+1 starts injection molding. These processes are repeated for molding. Illustration of the exchange of the signal between the insert mold attaching/detaching mechanism and insert mold conveying mechanism is omitted from FIG. 6 for convenience.

The invention claimed is:

1. A manufacturing method for a multi-color molded article, the method comprising:
multi-color molding performed by a plurality of injection molding machines configured to perform injection molding in a predetermined order and insert molds removably mounted in molds incorporated in the injection molding machines, respectively, said multi-color molding comprising:
a first step of injection-molding the molded article by a first one of the injection molding machines;
a second step of taking out the molded article molded in the first step, along with the insert mold fitted with the molded article, from the mold of the first injection molding machine;
a third step of transporting the insert mold removed in the second step to a second injection molding machine configured to perform injection molding next to the first injection molding machine;
a fourth step of attaching the insert mold transported in the third step to the mold of the second injection molding machine; and
a fifth step of performing injection molding by the second injection molding machine, wherein the second to fifth steps are repeated in the predetermined order for each of the injection molding machines,
wherein, in the third step of transporting, the insert mold being transported is released from hold or attraction at an intermediate station, on which the insert mold is placed, and is held or attracted again,
wherein the intermediate station is outside the molds, and
wherein injection molding is performed by simultaneously using a plurality of insert molds with different cavity shapes in molding conditions varied for each of the different cavity shapes.

2. The manufacturing method for a multi-color molded article according to claim 1, wherein the insert mold from which the molded article is removed after injection molding by the last one of the injection molding machines is disengaged from the mold of the last injection molding machine and incorporated again into the mold of the first injection molding machine.

3. The manufacturing method for a multi-color molded article according to claim 1, wherein gate cutting for the molded article is performed as the insert mold is disengaged from the mold of the injection molding machine or during transportation of the disengaged insert mold.

4. An injection molding system for multi-color molding, said injection molding system comprising:
a plurality of injection molding machines configured to perform injection molding in a predetermined order for multi-color molding;
insert molds removably mounted in molds incorporated in the injection molding machines, respectively;
an insert mold attaching/detaching mechanism configured to attach and detach the insert molds to and from the molds of the injection molding machines;
an insert mold conveying mechanism configured to transport the insert molds detached from the molds of the injection molding machines from one injection molding machine to another; and
an intermediate station outside the molds,
wherein the injection molding system for multi-color molding is configured so that:
a first one of the injection molding machines injection-molds a molded article and the insert mold attaching/detaching mechanism disengages the insert mold fitted with the molded article from the mold;
the insert mold conveying mechanism transports the insert mold to a subsequent or second injection molding machine, wherein the insert mold being transported is released from hold or attraction at the intermediate station, on which the insert mold is placed, and is held or attracted again;
the insert mold attaching/detaching mechanism incorporates the insert mold into the second injection molding machine;
a molding material different from that for the first injection molding machine is injection-molded by the second injection molding machine;
operations for disengaging the insert mold from the mold of the injection molding machine, transporting the disengaged insert mold, attaching the insert mold to the mold of the injection molding machine, and injection molding are repeated in the predetermined order; and
injection molding is performed by simultaneously using a plurality of insert molds with different cavity shapes in molding conditions automatically varied for each of the different cavity shapes.

5. The injection molding system according to claim 4, wherein the insert mold attaching/detaching mechanism comprises an insert mold attaching/detaching robot, an insert mold ejector mechanism incorporated in the mold, and/or an insert mold fixing mechanism incorporated in the mold.

6. The injection molding system according to claim 4, wherein the insert mold conveying mechanism comprises an insert mold conveying robot and/or a conveyor.

7. The injection molding system according to claim 4, wherein the insert mold from which the molded article is removed after injection molding by the last one of the injection molding machines is disengaged from the mold of the last injection molding machine by the insert mold attaching/detaching mechanism and the insert mold conveying mechanism and incorporated again into the mold of the first injection molding machine.

8. The injection molding system according to claim 4, wherein gate cutting for the molded article is automatically performed as the insert mold is disengaged from the mold of the injection molding machine or during transportation of the disengaged insert mold.

\* \* \* \* \*